United States Patent [19]
Ito et al.

[11] Patent Number: 5,734,632
[45] Date of Patent: Mar. 31, 1998

[54] OPTICAL HEAD USING EVANESCENT LIGHT AND OPTICAL DATA RECORDING/ REPRODUCING APPARATUS AND METHOD OF USING THE SAME

[75] Inventors: Kenchi Ito, Kokubunji; Toshimichi Shintani, Koganei, both of Japan

[73] Assignee: Hitachi, Ltd., Tokyo, Japan

[21] Appl. No.: 483,989

[22] Filed: Jun. 7, 1995

[30] Foreign Application Priority Data

Jun. 17, 1994 [JP] Japan ................... 6-135368

[51] Int. Cl.$^6$ .................................................. G11B 7/09
[52] U.S. Cl. .................... 369/44.23; 369/44.34; 369/112; 369/126
[58] Field of Search ............... 369/44.12, 44.23, 369/44.24, 112, 126

[56] References Cited

U.S. PATENT DOCUMENTS

| | | | |
|---|---|---|---|
| 4,860,276 | 8/1989 | Ukita et al. | 369/121 X |
| 5,159,586 | 10/1992 | Yamashita et al. | 369/44.11 X |
| 5,199,090 | 3/1993 | Bell. | |
| 5,343,460 | 8/1994 | Miyazaki et al. | 369/126 |
| 5,463,609 | 10/1995 | Inagaki et al. | 369/112 |

FOREIGN PATENT DOCUMENTS

| | | |
|---|---|---|
| 0 444 850 | 9/1991 | European Pat. Off. . |
| 0 549 236 | 6/1993 | European Pat. Off. . |
| 0 594 193 | 4/1994 | European Pat. Off. . |

OTHER PUBLICATIONS

Journal of Applied Physics, vol. 63, No. 26, Dec. 27, 1993, "Fiber laser probe for near-field scanning optical microscopy", Betzig et al., pp. 3550–3552.

Patent Abstracts of Japan, vol. 17, No. 314, (P–1557), Jun. 15, 1993, & JP5-034129.

*Primary Examiner*—W. R. Young
*Attorney, Agent, or Firm*—Fay, Sharpe, Beall, Fagan, Minnich & McKee

[57] ABSTRACT

An optical information recording/reproducing method for recording and reproducing information using an evanescent light beam includes the steps of installing an optical head near an optical information recording medium, the optical head having a semiconductor laser, a photodetector for detecting a laser beam emitted from a first end surface of the semiconductor laser, and a device for generating evanescent light from the laser beam emitted from a second end surface of the semiconductor laser; injecting a current into the laser to produce a laser beam; generating an evanescent light by the laser beam in the evanescent light generating device; and interacting the evanescent light with the recording medium to record information on or reproduce information from the recording medium.

13 Claims, 7 Drawing Sheets

OPTICAL HEAD USING EVANESCENT LIGHT AND OPTICAL DATA RECORDING/ REPRODUCING APPARATUS AND METHOD OF USING THE SAME

BACKGROUND AND SUMMARY OF THE INVENTION

The present invention relates to an optical disk device and an optical information processor using the optical disk device.

Attention has heretofore been given to optical disk devices as interchangeable media having large capacities. In recent years, however, the capacities of magnetic disk devices have been increased and the recording densities have reached around 1 gigabit per square inch which is almost equal to those of optical disks. From the present rate of increase in the capacity, the magnetic disk devices will probably surpass the optical disk devices in regard to recording density in the coming few years.

Efforts have heretofore been made to enhance the density of the optical disk devices by the following technical approaches: shortening the wavelength of the semiconductor laser beam that is used, establishing the technology of forming very small information recording marks, and establishing the technology of precisely reproducing the information of the recording marks that are smaller than the diameter of the beam spot. As for the first approach, there has been innovative progress such as the continuous-wave oscillation recently achieved at room temperature of a green laser made up of a group II–VI semiconductor, and the commercialization of a blue light-emitting diode made up of a group III–V semiconductor of gallium nitride. The second and third approaches are steadily progressing. Even when the approaches are integrated together, however, it is estimated that the recording density is increased by only ten fold at the greatest. The basic cause is that light cannot be made smaller than the wavelength of light due to the diffraction phenomenon of the light.

In order to break through this limit and to increase the recording density by a hundred times compared with the current recording density, attention has now been given to an optical recording/reproducing method by utilizing a proximity field (evanescent field). There is a report, for example, Applied Physics, Letters, Vol. 62, No. 2, pp. 142–144, 1992, of an example of fabrication in which an end of an optical fiber was formed into a conical shape. The end of the Optical fiber was coated with a metal except the tip region of several tens of nanometers to use the end as a probe, the probe was mounted on an precision actuator which used a piezo element to control its position, recording marks of 60 nm diameter were made on a multilayer film, and information was produced from them. In this case, the recording density reached 4.5 gigabits per square inch, which is about 50 times as great as the currently obtained recording density.

Recently, furthermore, there is another report, Applied Physics Letters, Vol. 63, No. 26, pp. 3550–3552, 1993, of an example of improving the S/N ratio by using an optical fiber which was doped with neodymium and by utilizing laser oscillation.

The above-mentioned prior art, however, involves problems, which will be described below.

First, the signal level was small. In the above-mentioned second prior art, the probe was brought close to a glass substrate on which a thin gold film was formed, the probe was moved in the direction perpendicular to the surface of the substrate by about 10 nm, and a signal the intensity of which was 30% modulated was detected. The detected power, however, was as small as 0.3 mW, compared to the 45 mW power of the incident light.

Second, the relaxation frequency of the fiber laser was as very low as 92 KHz, making it difficult to transfer the data at high speed.

Third, the distance between the substrate and the probe had to be controlled very accurately by using a scanning force microscope. When a disk where the optical information was recorded was rotated at high speed, therefore, it became no longer possible to control the high-frequency variation in the distance between the substrate and the probe due to the eccentricity of the disk.

Fourth, in the above-mentioned prior art, the light intensity at the time of recording the light intensity was modulated by using a deflector which utilized the acousto-optical effect. It was therefore difficult to modulate the light intensity at a frequency of higher than several tens of megahertz.

Fifth, as to the prior art, there is realized no tracking servo method which permits the light beam to follow the recording track, and therefore a practicable optical information recording/reproducing apparatus cannot be provided.

The following means are employed in order to solve the aforementioned problems.

First, by employing a semiconductor laser having a high gain as a laser resonator, an optical head is constituted by the semiconductor laser and a detector for detecting a laser beam going out from a mirror in one direction of the semiconductor laser, and means for generating evanescent light is provided at the opposite end to the mirror. In the optical head, as the means for generating evanescent light a conical dielectric probe is used. In the optical head, furthermore, a diffraction grating of an equal period having a concentric shape and a period shorter than the wavelength of the beam of the semiconductor laser is employed as the means for generating evanescent light. The diffraction grating is blazed in the direction toward the center of the diffraction grating, and the blazing direction is inverted at the center. In the optical head, furthermore, a conical dielectric probe which has an oval cross section in the direction perpendicular to the optical axis is employed as the means for generating the evanescent light. In the optical head, furthermore, the means for generating the evanescent light is a diffraction grating of an equal period in the one-dimensional direction having a period shorter than the wavelength of the beam of a semiconductor laser or a solid-state laser, wherein the phase is inverted by 180 degrees at the center line thereof. Furthermore, the diffraction grating is blazed, and the blazing direction is reversed at the center line thereof.

There is constituted an optical information recording/reproducing apparatus which comprises the above-mentioned optical head and the optical information recording medium. In the optical data recording/reproducing apparatus, the current injected during current-on time into the semiconductor laser for irradiating the optical information recording medium is set to be sufficiently larger than a threshold current value, and information is recorded on the optical recording medium by turning the current injected into the semiconductor laser on and off. Moreover, the current injected into the semiconductor laser with which the optical information recording medium is irradiated is set to be a threshold current value or a value near thereto, and the change in the oscillation condition of the semiconductor laser caused by the presence or absence of information recorded on the optical information recording medium that is irradiated is detected by the detector. Provision is further made of a structure or means for changing the longitudinal mode of the semiconductor laser into a multi-mode to decrease the noise.

In the optical data recording/reproducing apparatus, furthermore, the semiconductor laser, the detector and the dielectric light probe or diffraction grating are mounted on a floating slider and are floated by the air so as to follow the disk rotation at a high speed.

In the optical data recording/reproducing apparatus, wobble pits for effecting the tracking are formed in a portion of the optical data recording medium, the intensity of light from the wobble pits is detected, and the sample tracking is effected by using the detected signal in order to execute the tracking servo control operation. In the optical data recording/reproducing apparatus, furthermore, the dimension of the light beam falling on the optical recording medium differs in the circumferential direction of the optical recording medium and the direction perpendicular to the circumferential direction, and the ratio a/b of the dimension a of the light beam falling on the optical recording medium in the circumferential direction of the optical recording medium to the dimension b thereof in the direction perpendicular to the circumferential direction, is set to be not smaller than 5, without much increasing the recording density in the direction perpendicular to the circumferential direction but much increasing the recording density in the circumferential direction to facilitate the servo operation. Moreover, the light beam is formed by a dielectric probe having an oval cross section or by a one-dimensional diffraction grating.

The above-mentioned means work as described below overcome the problems.

First, by employing a semiconductor laser having a high gain as a laser resonator, an optical head is constituted by the semiconductor laser and a detector for detecting a laser beam going out from a mirror in one direction of the semiconductor laser, and means for generating evanescent light is provided at the opposite end to the mirror, whereby a small change in the interaction between the evanescent light and the optical information recording medium is amplified and is taken out as a large change in the optical output. In the optical head, furthermore, the means for generating the evanescent light is a dielectric probe of a conical shape or a diffraction grating of an equal period having a concentric shape and a period shorter than the wavelength of the beam of the semiconductor laser and, particularly, a diffraction grating which is blazed in the direction toward the center of the diffraction grating and in which the blazing direction is reversed at the center, in order to enhance the interaction between the evanescent light and the optical information recording medium and to increase the detection signal. In the optical head, furthermore, there is employed as the means for generating evanescent light, a conical dielectric probe which has an oval cross section in the direction perpendicular to the optical axis or a diffraction grating of an equal period in the one-dimensional direction having a period shorter than the wavelength of the beam of the semiconductor laser, in which the phase is inverted by 180 degrees at the center line thereof, and particularly which is blazed, and the blazing direction of which is reversed at the center line thereof. This makes it possible to generate an evanescent light beam having different diameters in the longitudinal and lateral directions.

There is constituted an optical information recording/reproducing apparatus which comprises the above-mentioned optical head and the optical information recording medium. In the optical information recording/reproducing apparatus, a current injected during the current-on time into the semiconductor laser to irradiate the optical information recording medium is set to be sufficiently larger than a threshold current value, and the information is recorded on the optical recording medium by turning the current injected into the semiconductor laser on and off, whereby high-frequency recording can be achieved and the recording rate can be greatly improved. Moreover, the current injected into the semiconductor laser with which the optical information recording medium is irradiated is set to be a threshold current value or a value near thereto, and the change in the oscillation condition of the semiconductor laser caused by the presence or absence of information recorded on the optical information recording medium that is irradiated is detected by the detector, making it possible to greatly increase the amplitude of the detection signal. Provision is further made of a structure or means for changing the longitudinal mode of the semiconductor laser into a multi-mode to decrease the noise.

In the optical data recording/reproducing apparatus, furthermore, the semiconductor laser, the detector and the dielectric light probe or diffraction grating are mounted on a floating slider and are floated by the air so as to follow the disk which is rotating at a high speed. The apparatus therefore can be easily mounted on the existing magnetic disk devices.

In the optical information recording/reproducing apparatus, wobble pits for effecting the tracking are formed in a portion of the optical information recording medium, the intensity of light from the wobble pits is detected, and the sample tracking is effected by using the detected signal in order to execute the tracking servo control operation. Therefore, the apparatus can be easily mounted on an existing magnetic disk devices. Furthermore, the dimension of the light beam falling on the optical recording medium differs in the circumferential direction of the optical recording medium and the direction perpendicular to the circumferential direction, and the ratio a/b of the dimension a of the light beam falling on the optical recording medium in the circumferential direction of the optical recording medium to the dimension b thereof in the direction perpendicular to the circumferential direction, is set to be not smaller than 5, without much increasing the recording density in the direction perpendicular to the circumferential direction but much increasing the recording density in the circumferential direction to facilitate the servo operation. It therefore makes it easy to form pre-pits for the sample tracking, relaxes the precision required for the servo operation and facilitates the practical operation. Moreover, the light beam is produced by a dielectric probe having an oval cross section or by a one-dimensional diffraction grating making it possible to easily form a light beam of an asymmetrical shape that is suited for use in the above-mentioned servo operation.

DESCRIPTION OF THE PREFERRED EMBODIMENTS

Referring to the drawings, the embodiments of the invention will be described below.

Figure 1:
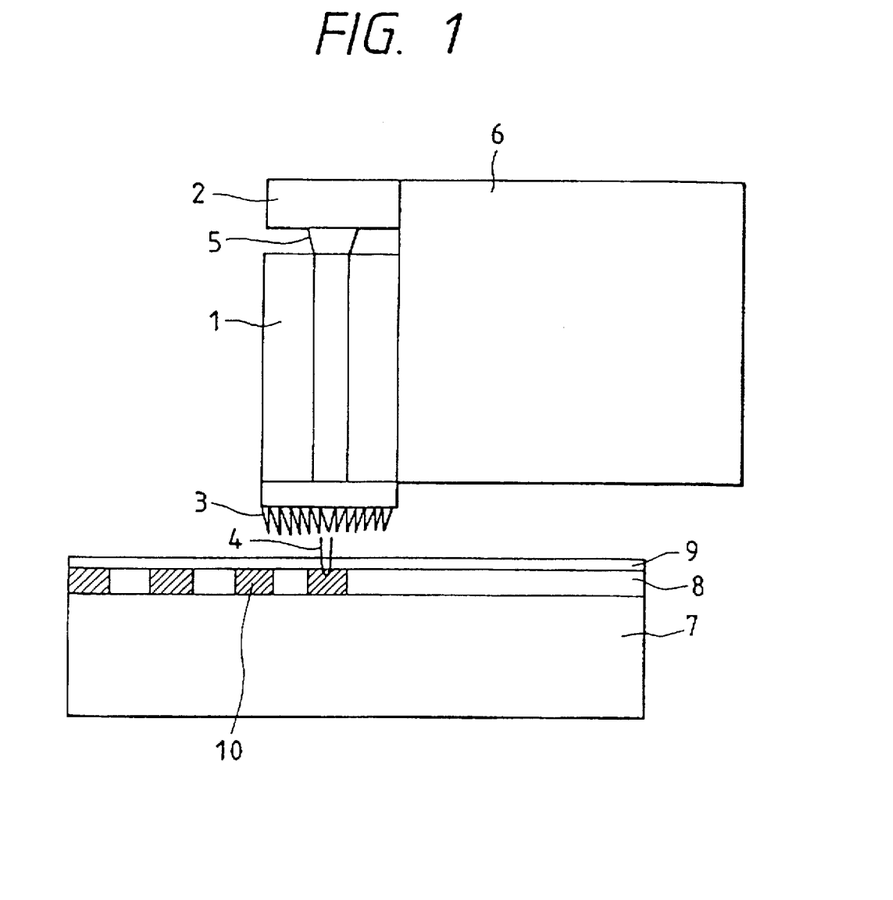
FIG. 1 illustrates an optical head according to an embodiment of the present invention.

FIG. 1 illustrates an optical head according to an embodiment of the present invention. The light having a wavelength of 830 nm generated from a semiconductor laser 1 is monitored by a photodetector 2 installed at the back of the laser. To the other end of the semiconductor laser is stuck a Fresnel lens 3 of which the grating has the shape of a blaze in cross section. The refractive indicies of the adhesive used for sticking the lens and the material of the Fresnel lens at a wavelength of 830 nm are desirably such values as prevent the reflection between the semiconductor laser 1 and the Fresnel lens 3. If the period of the Fresnel lens is set to be shorter than 830 nm which is the wavelength of the laser beam, evanescent light can be generated.

In recording information, evanescent light that is generated acts upon a phase change recording medium 8 formed on a substrate 7 through a protective film 9, and forms optical recording domains 10.

In reproducing information, the current injected into the semiconductor laser is decreased down to nearly the threshold value of the semiconductor laser to reproduce the recorded information. Since the reflectance of the medium changes in a portion of the optical recording domain 10 due to the optical recording, the degree of the interaction between the recording medium and the evanescent light changes, resulting in a change in the reflectance of a laser resonator. This small change is greatly amplified by the laser resonator, and the power of laser beam 5 from the resonator is greatly modulated. This signal light 5 is guided to the photodetector 2 and is detected. Furthermore, the semiconductor laser 1, photodetector 2, and Fresnel lens 3 are mounted on a floating slider 6 so as to maintain constant the distance between the optical data recording medium and the probe.

The intensity distribution of the spot of the generated evanescent light is expressed by equation 1.

$$I(r) = J_0(2\pi r/\lambda) \quad \text{Equation 1}$$

I(r): the intensity of light at a distance r from the center,
$J_0$: 0-th order Bessel function,
r: distance from the center,
A: period of diffraction grating.

The radius r that gives a half-width of the main probe of the 0-th order Bessel function is given by r≈0.2λ. Therefore, the resolving power increases with a decrease in the period of the diffraction grating. For instance, if there is formed a diffraction grating having a period of 0.5 μm, the resolving power becomes a diameter of 0.1 μm, and a recording density of higher than 20 gigabits/sq. in. can be accomplished.

According to this embodiment, furthermore, the optical head can be realized in a greatly reduced size. So far, an optical fiber has been used as a probe, and the apparatus has been very bulky. According to the present invention, however, the small semiconductor laser 1, a photodetector 2 and a Fresnel lens 3 are mounted on the floating slider 6, and the size of the device can be greatly decreased down to the one that is little different from present magnetic disks.

Next, the probe used for generating evanescent light will be described.

Figure 2A:
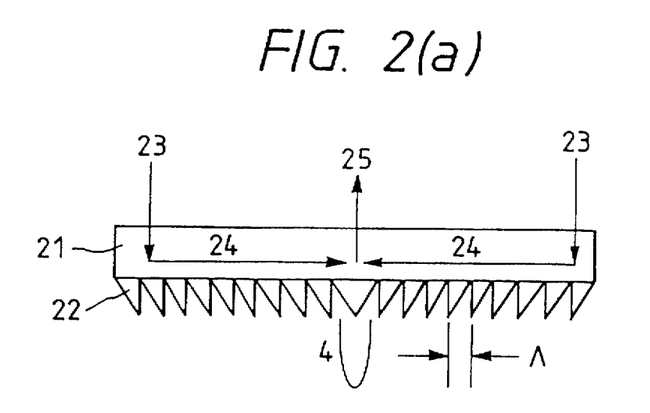
FIGS. 2(a) and 2(b) illustrate side and top views, respectively, of a probe of a Fresnel type lens used in the first embodiment of the present invention.
Figure 2B:
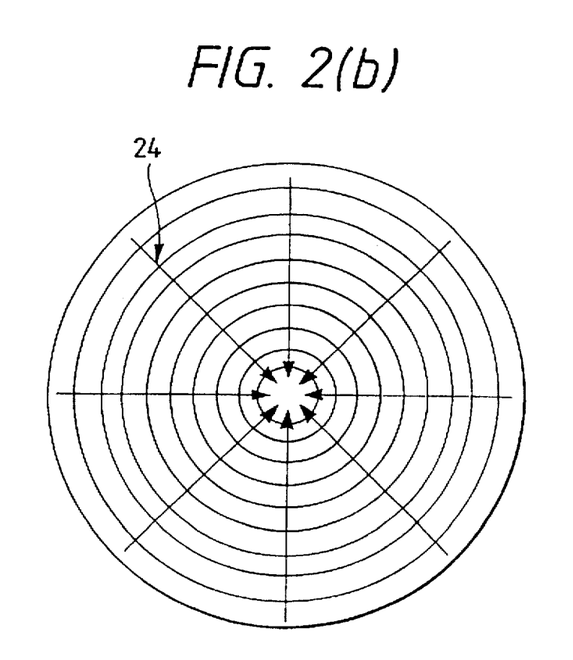

FIGS. 2(a) and 2(b) illustrate in detail the probe of a Fresnel lens type used in the first embodiment of the present invention. The probe is constituted by the blazed-type diffraction grating 22 having an equal period formed on the substrate 21. The incident light 23 is turned into diffracted light 24 by the blazed-type diffraction grating 22 and is collected in the probe. When the period E© of the diffraction grating is shorter than the wavelength, the diffracted light is not allowed to proceed out of the probe and most of the light is reflected as designated by 25, but part of the light turns into evanescent light 4 of a 0-th order Bessel function and oozes out of the probe. When an optical information recording medium exists very close to the probe, interaction between the localized evanescent light and the optical information recording medium occurs, and the reflectance of the recording medium effectively undergoes a change to record information. When use is made of a diffraction grating in which the blazing direction is reversed at the center thereof, furthermore, it is possible to increase the detection signal in reproducing information.

Figure 3A:
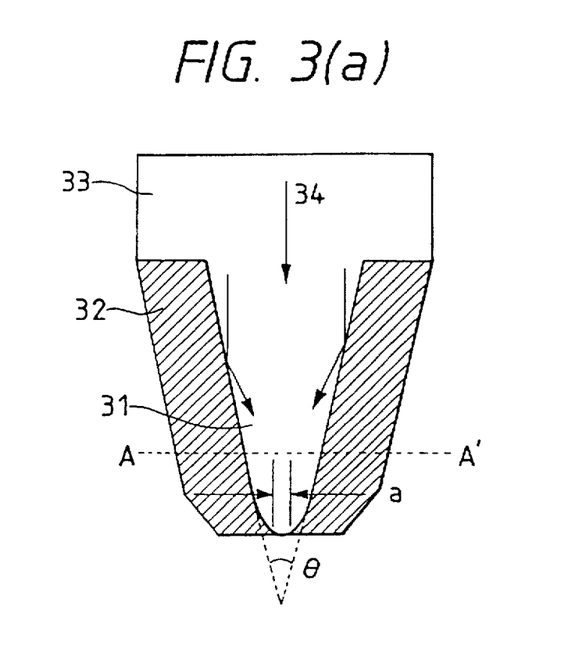
FIG. 3(a) is a side view, partially in section, of a second probe for generating evanescent light according to an alternative embodiment of the present invention.
Figure 3B:
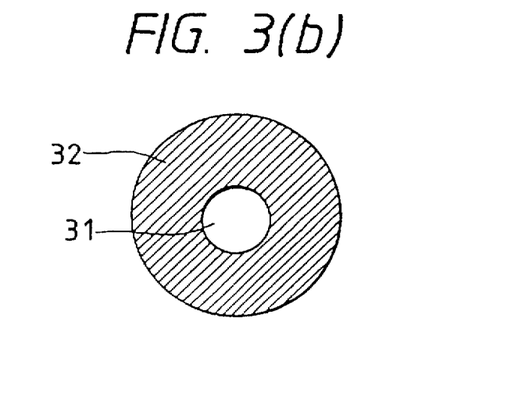
FIG. 3(b) is a cross sectional view thereof taken along line A—A'.

FIGS. 3(a) and 3(b) illustrates a second probe for generating evanescent light which is different from that of the above-mentioned first embodiment, wherein reference numeral 33 denotes an optical fiber connected to the light source, 31 denotes a conical glass probe fabricated by chemical etching or the like method, 32 denotes a coating film of metal, and the glass probe 31 is exposed at a tip portion thereof only. The tip angle θ of the probe 31 is set small, and the incident light 34 is guided to the tip of the probe as it is totally reflected by the conical surface of the probe. Most of the light is absorbed by the metal film 32 but part of the light oozes out as evanescent wave from the opening at the tip and interacts with the optical information recording medium.

The resolving power of the probe is nearly equal to the diameter a of the opening. At present, an opening having a diameter of about 50 nm can be currently formed and, in this case, the recording density becomes as very great as from 100 to 150 gigabits/sq. in.

Figure 4A:
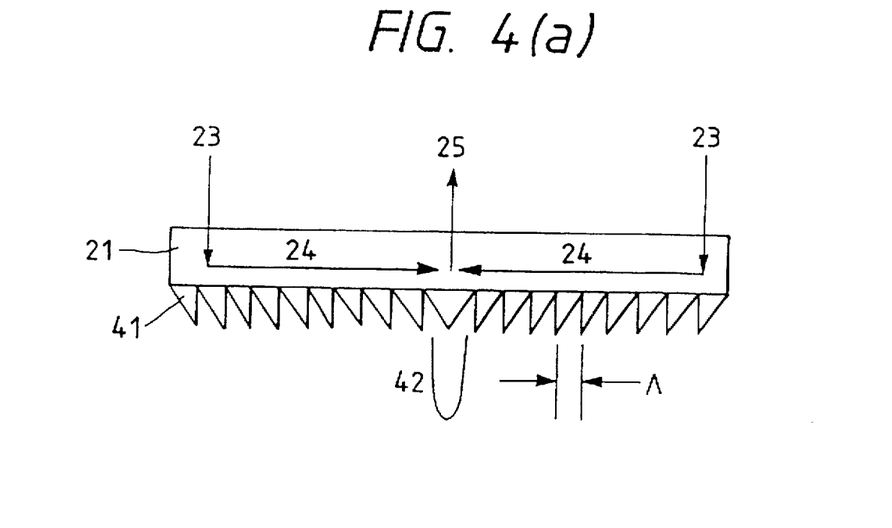
FIG. 4(a) is a side view of a probe of a defraction grating type for generating evanescent waves according to another embodiment of the present invention.
Figure 4B:
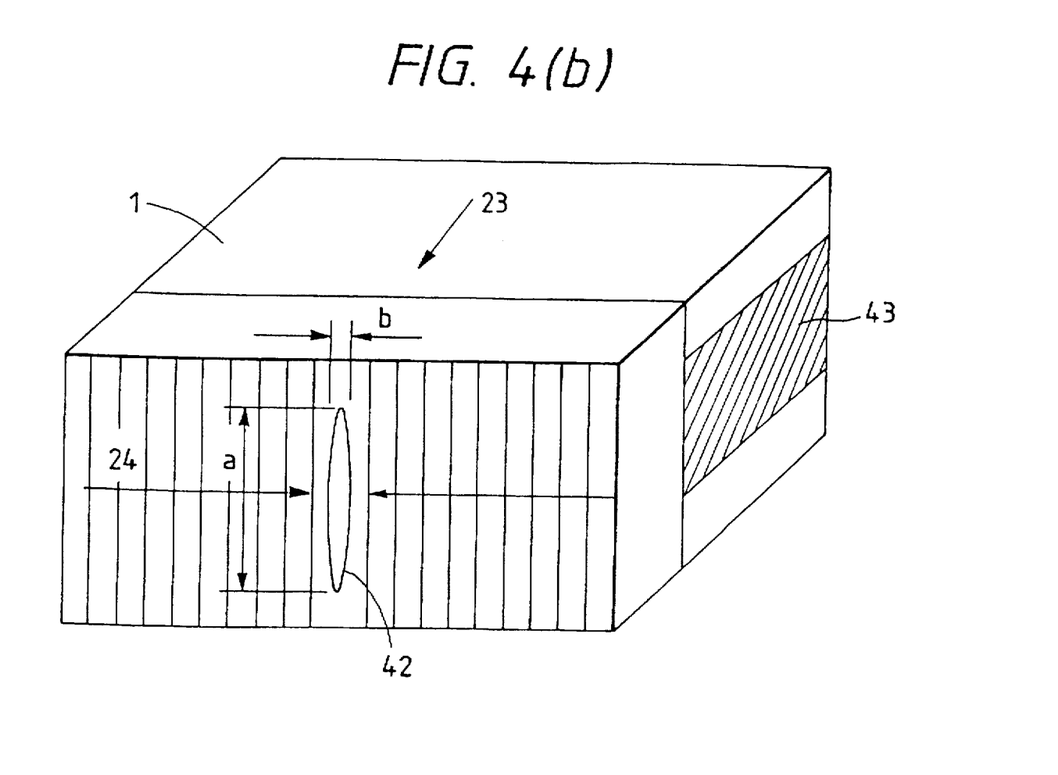
FIG. 4(b) is a perspective view thereof.

FIGS. 4(a) and 4(b) show a probe of a diffraction grating type for generating evanescent waves that are localized in a one-dimensional direction only. The probe is constituted by a blazed-type diffraction grating 41 of an equal period formed on the substrate 21. The same constituent members as those shown in FIGS. 2(a) and 2(b) are denoted by the same reference numerals. However, the shape of the grating is not concentric but is linear.

FIG. 4(b) is a perspective view of the probe. In the semiconductor laser 1, the light is propagated being almost confined in an active layer 43. The guided wave 23 is diffracted by the blazed-type diffraction grating and is collected at the center of the probe as designated by 24. In this case, when the period λ of the diffraction grating is shorter than the wavelength, the diffracted light is not allowed to proceed out of the probe and most of the light is reflected as designated by 25, but part of the light turns into evanescent light 42 of a 0-th order Bessel function type and oozes out of the probe.

In FIG. 4(b), unlike the probe of FIG. 2, however, the diffraction grating is one-dimensional, and the light is localized as evanescent light in only the direction of the lattice vector of the diffraction grating, and the beam size in the direction perpendicular to the lattice vector becomes nearly the same as that of the light beam propagated through the active layer 43. For instance, when the active layer 43 of the semiconductor laser 1 has a thickness of 0.1 µm, the size b of beam in the direction of thickness of the active layer becomes nearly b=0.5 µm though it depends upon the difference in the index of refraction between the active layer and the clad layer. If there is formed evanescent light having a width a=0.1 µm using a diffraction grating with a period of λ=0.5 µm, then, there can be formed a beam having an aspect ratio a/b of 5. By using such a light beam, it is possible to constitute an optical information recording/reproducing apparatus whose recording density is greatly increased in the circumferential direction of the disk but whose track pitch is not so much decreased. In this case, if use is made of a diffraction grating in which the blazing direction is revsersed at the center line thereof, it is possible to effectively form evanescent light having a dissimilar longitudinal-to-transverse ratio in the beam system.

Figure 5A:
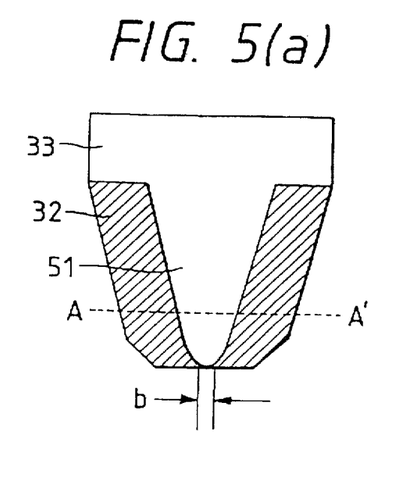
FIG. 5(a) is a side view, partially in section, of a dielectric probe for generating evanescent waves according to a further embodiment of the present invention.
Figure 5B:
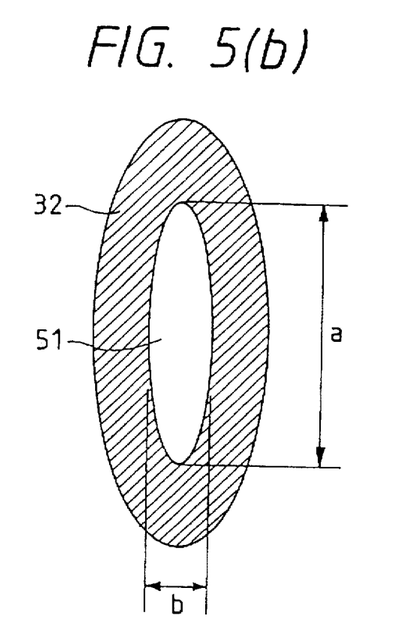
FIG. 5(b) is a cross sectional view thereof taken along line A—A'.

FIGS. 5(a) and 5(b) illustrate a dielectric probe for generating evanescent waves that are localized in one-dimensional direction only. The same constituent elements as those of FIG. 3(a) are denoted by the same reference numerals. In this embodiment as shown in FIG. 5(b), the tip of the optical fiber 33 is shaped into a probe 51 having an oval cross section. The ratio a/b of the major axis a to the minor axis b is 5, and hence produces a beam of a one-dimensional direction like that of the diffraction grating of FIGS. 4(a) and 4(b).

The principle of recording and reproducing information using the optical information recording/reproducing apparatus will now be explained.

Figure 6:
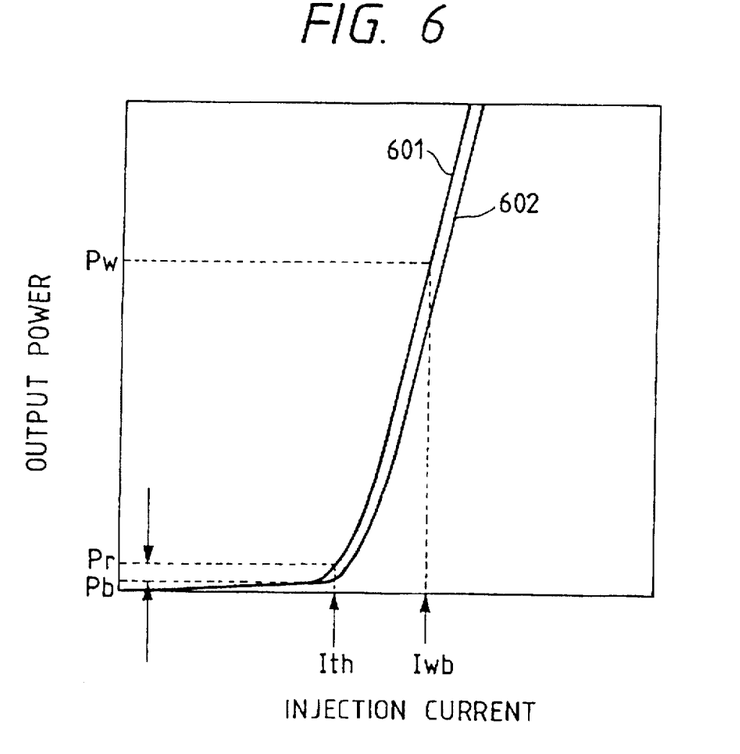
FIG. 6 is a diagram illustrating the relationship between the optical output and the current injected into a laser of an optical head of the present invention.

FIG. 6 is a diagram illustrating the relationship between the optical output and the current injected into the laser, and explaining the state where the semiconductor laser is driven in the optical head of the present invention.

Figure 7A:
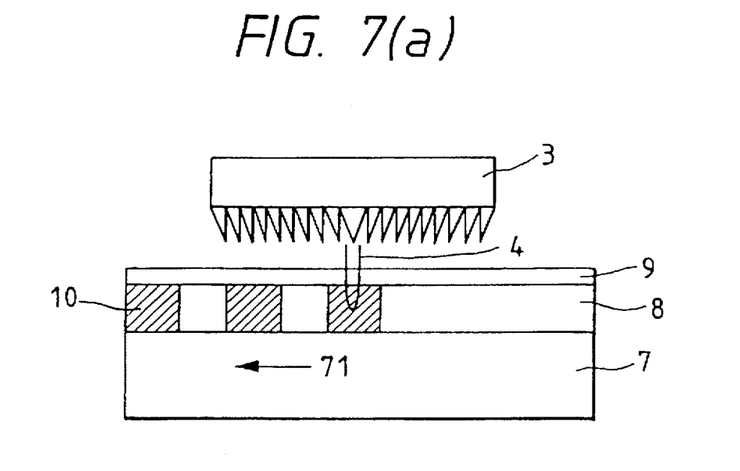
FIGS. 7(a) and 7(b) are diagrams useful for explaining the principle of recording and reproducing information according to the present invention.
Figure 7B:
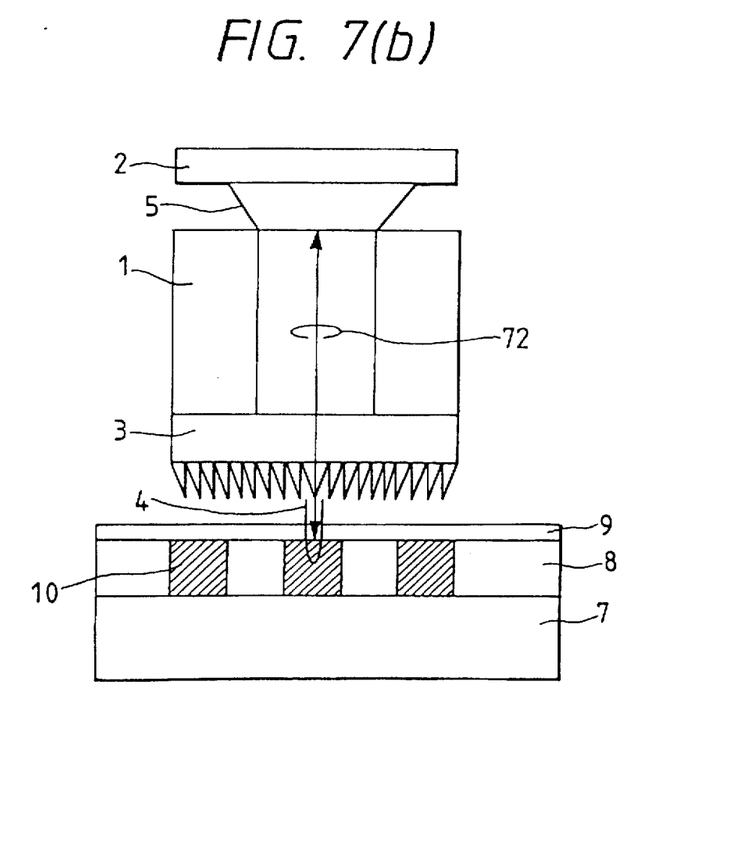

FIGS. 7(a) and 7(b) are diagrams for explaining the principle of recording and reproducing information according to the present invention.

The recording operation will now be described with reference to FIGS. 6 and 7a. In recording as shown in FIG. 6, a recording bias current Iwb which is much larger than the threshold current Ith of the semiconductor laser is injected to obtain a laser power Pw necessary for recording information on the recording medium. The optical power that is really needed varies greatly depending upon the area A of the evanescent beam 4 generated by the probe and the distance d between the probe and the recording film 8. This will now be concretely described.

The relationship between the optical power P and the injected current I in a general semiconductor laser of a Fabry-Perot type is represented by equation 2.

$$P = \frac{h\nu}{e} \cdot \eta \cdot (I - I_{th})$$ Equation 2

P: output power,
h: Plank's constant,
v: frequency of light,
e: elementary charge,
η: slope efficiency,
I: injected current,
Ith: threshold current.

Here, the slope efficiency of the output on the photodetector side is represented by equation 3.

$$\eta = \frac{\frac{1}{2} l_n \frac{1}{R_1}}{\alpha_i L + \frac{1}{2} l_n \left( \frac{1}{R_1} \cdot \frac{1}{R_2} \right)}$$ Equation 3

$\alpha_i$: light absorption coefficient in the laser,
L: length of the laser,
$R_1$: reflectance on the photodetector side,
$R_2$: reflectance on the evanescent light probe side.

Here, the threshold current Ith is represented by equation 4.

$$I_{th} = I_0 + \frac{J_0 d}{\eta_{spon}} A + \frac{dA}{\eta_{spon}\beta\Gamma} \left( \alpha_i + \frac{1}{2L} l_n \frac{1}{R_1 R_2} \right)$$ Equation 4

$I_0$: leakage current,
$J_0$: value $J_{nom}$ with which g becomes zero when the gain coefficient is approximated to be $g=\beta(J_{nom}-J_0)$,
$J_{nom}$: normalized current density,
β: coefficient that gives the relation between g and $J_{nom}$.
d: thickness of active layer,
A: stripe area,
$\eta_{spon}$: internal quantum efficiency of spontaneous emission,
Γ: coefficient of confinement of light in the laser.

In this embodiment, L=300 µm, α is 10 (/cm) on the assumption that GaAs is used, R1=0.1. According to the above-mentioned prior art, when evanescent light of a diameter of 100 nm is generated using the probe of FIGS. 2(a) or 3(a), the effective probe reflectance R2 is 0.01 when d=50 nm and, in this case, η becomes 0.267 (W/A). Furthermore, when the stripe width W is 5 µm, d=0.1 µm, β=23 and J₀=4 on the assumption that GaAs is used, Ith=32.3 (mA), if Γ=0.5 considering a leakage current of about I₀=10 mA.

The output power of evanescent light 4 from the probe is smaller than the optical output on the detector side by nearly the ratio of reflectances, and the slope efficiency θ1 is estimated to be about 0.0267 (W/A).

Assuming that a phase change medium is used as an optical information recording medium, the recording power is required to be 20 mW under the current condition of a recording rate of 50 Mbps. According to this embodiment, the spot size is 0.008 square µm which is about 1/188 with respect to the spot area of recording light of 1.5 square µm of the existing apparatus of a wavelength of 780 nm and in which the objective lens have an NA of 0.55. Therefore, the recording power needs to be about 0.1 mW and, hence, the injected current needs to be set to a value which is larger than the threshold current by about 4 mA. Moreover, modulation at a rate higher than 50 Mbps necessary for the recording can be realized by directly modulating the intensity of the semiconductor laser. Therefore, the present invention does not require a modulator using an acousto-optical element used in the prior art, and makes it possible to sufficiently cope with the high recording speed of up to about 1 Gbps that will be required in the future.

The reproduction will be described with reference to FIGS. 6 and 7b. When use is made of the optical head of the present invention, furthermore, a great merit is obtained in reproducing information at high speeds. During the reproduction, the current injected into the semiconductor laser is biased to the threshold current Ith. In the optical head of the present invention as shown in FIG. 7b, a resonator 72 is constituted between the mirror on the photodetector 2 side of the semiconductor laser 1 and the recording layer 8 of the optical information recording medium. The refractive index of the medium changes depending upon the presence or absence of data pit 10. The amount of change is about 50%, and the effective reflectance R2 changes from 0.01 to 0.005 depending upon the presence or absence of pits. Therefore, the optical output/injected current characteristics of the resonator 72 undergo a change depending upon the presence or absence of pits. In FIG. 6, a curve 601 represents the characteristic of the case of when the medium has a low reflectance (when there exist pits), and a curve 602 represents the characteristic of the case of when the medium has a high reflectance factor (when there exists no pit). In the above-mentioned case, the threshold current Ith increases by 1.5 mA from 32.3 mA to 33.8 mA. If the bias current is to 33.8 mA, an optical output Pr of when there exist pits is obtained in principle, and no optical output is obtained when there exists no pit. It is therefore possible to obtain optical output signals modulated by pits. In the above-mentioned example, the optical output Pr becomes 0.4 mW when there exist pits, which is large enough to be detected.

The optical output is actually not zero due to the spontaneously emitted light even when the current is the threshold current, and a very weak light output Pb is produced even when there exists no pit. Accordingly, the modulation degree never reaches 100% which, however, is very great compared with the degree of 30% of the known art. Moreover, the relaxation frequency of the carrier of the semiconductor laser is of the order of nanoseconds, and the response frequency of up to about 1 GHz can be sufficiently accomplished, making it possible to realize high-speed reproduction and transfer that have been never accomplished with the prior art.

Figure 8A:
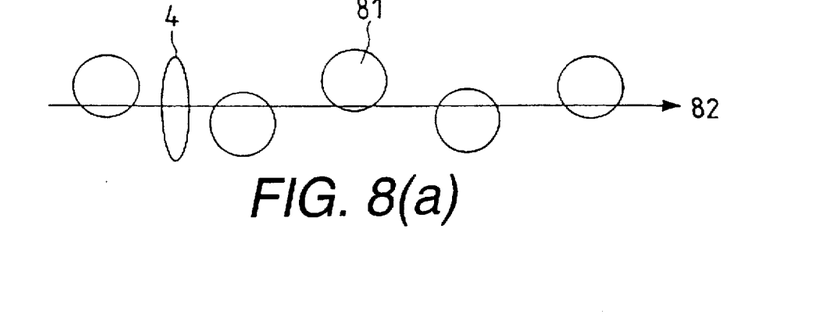
FIGS. 8(a), 8(b) are enlarged views of a portion of the servo region of the disk of FIG. 8(b).
Figure 8B:
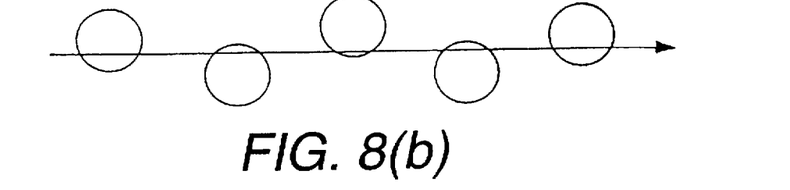
Figure 8C:
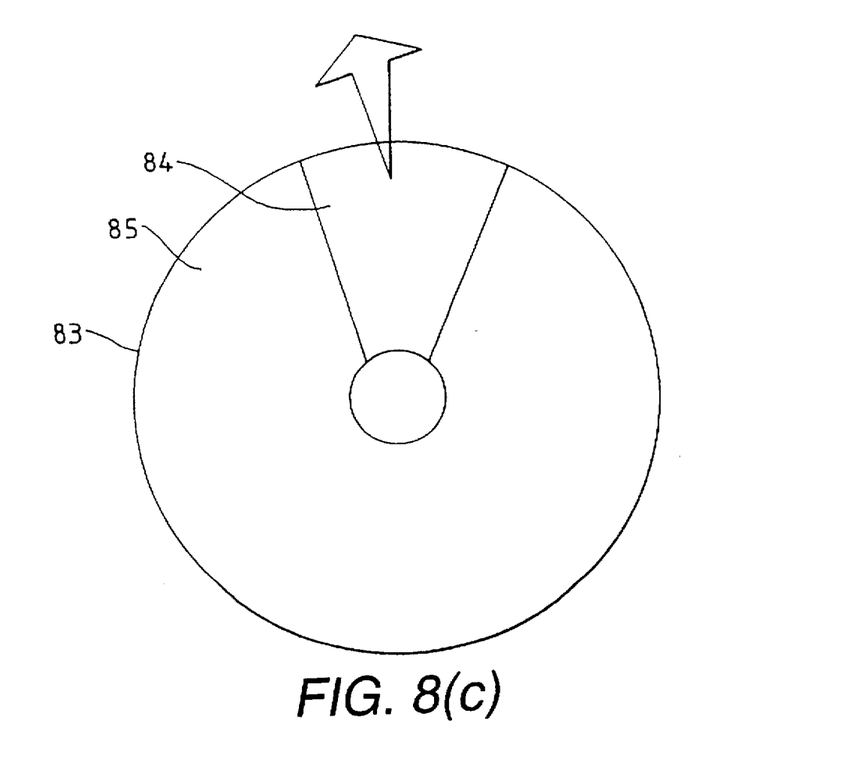
FIG. 8(c) is a top view of a disk having a servo region and a data region.

With reference to FIGS. 8(a) and 8(b) and 8(c) positioning and servo technologies according to the present invention will be described. According to the prior art, information is optically recorded and reproduced by simply recording information pits at points spaced apart by several tens of nanometers and reproducing them, which is different from that of a practicable optical information recording/reproducing apparatus in which information is recorded at arbitrary positions on the disk along the recording track, and are reproduced. In practice, therefore, it is necessary to provide practicable tracking technology. According to the present invention, therefore, the tracking is carried out as described below.

First, as shown in FIG. 8(c), evanescent light is formed in the tracking direction (i.e., in the circumferential direction of the disk) by using the probe shown in FIGS. 4 or 5, and a light beam 42 having a slightly broad width is formed in the direction perpendicular thereto. It is desirable that the ratio of the beam diameters is 5:1 or greater.

FIG. 8(b) shows a disk 83 which includes a servo region 84 in which pre-pits 81 have been formed in advance and a data region 85. The pre-pits 81 shown in the enlarged view of FIG. 8(b) are wobble pits which are so arranged that the centers of the pits are deviated by a predetermined distance toward the right and left from the center 82 of the track. With the pre-pits being scanned with the light beam, if the light 4 deviates from the center 82 of the track, signals from the consecutive two pre-pits lose balance, and the difference between these signals is regarded as a tracking error signal. In this case, if use is made of the above-mentioned light beam 42 having a beam diameter a of, for example, 0.1 μm in the direction of the track and a beam diameter b of 0.5 μm in the direction perpendicular thereto, the track pitch can be set to be 0.5 μm and, hence, the diameter of the wobble pit can be selected to be about 0.3 μm.

If the pre-pit has a diameter of 0.3 μm, the disk can be well produced using the current technology of producing an optical mother disk, and replica disks can be easily produced in large quantities without requiring any particular technology. In this case, the recording density of about 10 gigabits/sq. in. can be accomplished. The minor axis a of the light beam can be further decreased by using a diffraction grating probe having small period or a dielectric probe having a small aperture, and the recording density can be further increased by more than several times. According to the present invention, the light beam is positioned on the track by the sample tracking using the tracking error signal.

According to the present invention, furthermore, the distance between the disk and the probe is controlled by the air floating head, and, hence, a so-called focusing servo operation is not required. According to the present invention as described above, the positioning system is very simple, and there is no need of carrying out complex positioning servo operation which is required for the ultra-high-density optical information recording/reproducing apparatus.

Finally, the noise in the apparatus of the present invention will be described. According to the invention, when information is reproduced, the semiconductor laser is driven with a current which is nearly equal to the threshold current. The noise of the semiconductor laser greatly increases when the semiconductor laser is driven with a current which is nearly equal to the threshold current. In order to suppress the noise when the semiconductor laser is driven with the threshold current, it is desirable in the present invention that the longitudinal mode is made a multi-mode during the reproduction. Concretely speaking, the current which is nearly equal to the threshold current is modulated by a frequency of as high as from about 100 to about 600 MHz. This enables the longitudinal mode of the semiconductor laser to be a multi-mode and makes it possible to greatly decrease the noise during the reproduction.

According to the present invention as described above, an ultra-high-density optical information recording/reproducing apparatus having a recording density of larger than 10 gigabits/sq. in. is constituted in a small size maintaining a sufficiently practicable S/N ratio, adopting a simply constructed positioning system.

We claim:

1. An optical information recording/reproducing method wherein an optical head is installed near an optical information recording medium, said optical head having a semiconductor laser, a detector for detecting a laser beam going out from a first end surface of said semiconductor laser, and means for generating evanescent light from a laser beam going out from a second end surface of said semiconductor laser, said method comprising the steps of:

positioning said semiconductor laser in said optical head between said detector and said means for generating evanescent light;

installing said optical head near said optical information recording medium;

injecting a current into said semiconductor laser to produce a laser beam;

generating an evanescent light by said laser beam in said means for generating evanescent light;

interacting said evanescent light with said optical information recording medium to record information thereon or to produce an optical output signal; and amplifying said optical output signal by said semiconductor laser to reproduce information from said recording medium.

2. An optical information recording/reproducing method according to claim 1, further comprising the steps of setting said current injected into said semiconductor laser to be larger than a threshold value and turning said current on and off to irradiate said optical information recording medium with said evanescent light to record information.

3. An optical information recording/reproducing method according to claim 1, further comprising the steps of setting said current injected into said semiconductor laser to be at or near a threshold value, irradiating said optical information recording medium with said evanescent light and detecting a change in an oscillation condition of said semiconductor laser caused by the presence or absence of information on said optical information recording medium to reproduce information.

4. An optical information recording/reproducing method according to claim 1, wherein said optical head is mounted on a floating slider, and said method further comprises the steps of maintaining a predetermined distance between said optical information recording medium and said optical head.

5. An optical information recording/reproducing method according to claim 1, wherein use is made of an optical disk in which are formed wobble marks for effecting the tracking as said optical information recording medium, said wobble marks are irradiated with a light beam, the intensity of light returning from said wobble marks is detected, and the sample tracking is effected by using said detected intensity.

6. An optical information recording/reproducing method according to claim 5, wherein the dimension of said light beam in cross section differs in the circumferential direction of said optical disk and the direction perpendicular to said circumferential direction.

7. An optical information recording/reproducing method according to claim 6, wherein the ratio a/b of the dimension a of said light beam in the circumferential direction of said optical recording medium to the dimension b thereof in the direction perpendicular to the circumferential direction, is not smaller than 5.

8. An optical information recording/reproducing method according to claim 7, wherein said means for generating evanescent light is a conical dielectric probe which has an oval cross section in the direction perpendicular to the optical axis.

9. An optical information recording/reproducing method according to claim 7, wherein said means for generating evanescent light is a diffraction grating of an equal period in the one-dimensional direction, has a period shorter than the wavelength of the beam of said semiconductor laser, and has a phase that is inverted by 180 degrees at the center line thereof.

10. An optical information recording/reproducing method according to claim 9, wherein said diffraction grating is blazed, and the blazing direction is reversed at the center line thereof.

11. An optical information recording/reproducing method according to claim 1, wherein said means for generating evanescent light has a dielectric probe of a conical shape.

12. An optical information recording/reproducing method according to claim 1, wherein said means for generating evanescent light comprises a diffraction grating of an equal period having a concentric shape, the period being shorter than the wavelength of the beam of said semiconductor laser.

13. An optical information recording/reproducing method according to claim 12, wherein said diffraction grating is blazed in a direction toward the center of the diffraction grating, and the blazing direction is reversed at said center.

* * * * *